(12) United States Patent
Betzer Tsilevich

(10) Patent No.: US 7,814,867 B2
(45) Date of Patent: Oct. 19, 2010

(54) REACTION CHAMBER FOR A DIRECT CONTACT ROTATING STEAM GENERATOR

(75) Inventor: Maoz Betzer Tsilevich, Southwest Calgary (CA)

(73) Assignee: Ex-Tar Technologies, Inc., S.W. Calgary, Alberta (CA)

( * ) Notice: Subject to any disclaimer, the term of this patent is extended or adjusted under 35 U.S.C. 154(b) by 431 days.

(21) Appl. No.: 12/037,703

(22) Filed: Feb. 26, 2008

(65) Prior Publication Data

US 2009/0211539 A1 Aug. 27, 2009

(51) Int. Cl.
*F27B 7/30* (2006.01)
*F28C 3/18* (2006.01)

(52) U.S. Cl. ............... 122/11; 122/367.4; 432/103; 432/217

(58) Field of Classification Search ............ 122/11, 122/12, 367.4; 432/103, 106, 214, 215, 217
See application file for complete search history.

(56) References Cited

U.S. PATENT DOCUMENTS

| | | | |
|---|---|---|---|
| 1,296,367 A * | 3/1919 | Cochran | 208/48 R |
| 1,855,819 A | 4/1932 | Blomquist et al. | |
| 1,898,086 A * | 2/1933 | Frisch | 241/33 |
| 2,512,259 A * | 6/1950 | Pike | 422/206 |
| 2,916,877 A | 12/1959 | Walter | |
| 3,378,244 A * | 4/1968 | Walther, Jr. | 432/216 |
| 3,477,701 A * | 11/1969 | Kanichiro et al. | 432/217 |
| 3,493,344 A * | 2/1970 | St John | 165/8 |
| 4,398,604 A | 8/1983 | Krajicek et al. | |
| 4,463,803 A | 8/1984 | Wyatt | |

FOREIGN PATENT DOCUMENTS

| | | |
|---|---|---|
| GB | 0328339 | 5/1930 |
| JP | 581153576 | 9/1983 |
| RU | 2285199 | 12/2004 |

* cited by examiner

*Primary Examiner*—Gregory A Wilson
(74) *Attorney, Agent, or Firm*—Egbert Law Offices PLLC

(57) ABSTRACT

The present invention is an apparatus and method for producing a steam and $CO_2$ mixture, as a super heated dry steam mixture. The apparatus includes a rotatable vessel having a combustion section and a steam producing section. There may also be a dry solid removal, a steam production and solid scrubbing vertical vessel, and a heat exchanger. The vessel is partially filled with spherical bodies, and the sections are partially separated by a partition. A discharge section is located at an end of the steam producing section. A homogenizing section has at least one partition wall guiding flow of gases. The process for producing the steam mixture includes mixing a low quality fuel with an oxidation gas, combusting in a rotating drum filled with spherical bodies, and mixing low quality water with a controlled temperature to generate steam. All liquids convert to gas so that there is no liquid discharge.

20 Claims, 7 Drawing Sheets

REACTION CHAMBER FOR A DIRECT CONTACT ROTATING STEAM GENERATOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an apparatus and method to produce steam, gas, and solid waste without waste water from low quality water and low quality fuel by direct contact in a rotating pressurized vessel.

2. Description of Related Art Including Information Disclosed Under 37 CFR 1.97 and 37 CFR 1.98

Generally, steam production facilities are divided into two main types: direct contact steam production facilities, and indirect steam facilities steam production facilities. In direct contact steam production facilities, water is mixed with hot gases to produce steam by direct heat exchange between the water and the gases to provide a mixture of steam and gas. In an indirect steam production facility, the heat that is required to produce the steam from the water is provided through a metal wall, typically a steel wall, that prevents the mixture of the water and hot gases.

Indirect contact steam generation is widely used for steam production. The devices vary from steam drum boilers to Once-Through Steam Generators (OTSG). The heat exchange can be by radiation, convection or both.

The direct-contact steam generators are much more limited in use than the non-direct contact steam generator. One of the proven applications for the direct contact steam generation process is enhanced oil recovery (EOR), wherein steam and flue gas (mainly $CO_2$) mixtures are injected into a heavy oil reservoir to increase oil mobilization in heavy oil production.

The main characteristic of the direct contact steam generator is that the produced steam contains impurities, such as combustion products (mainly gases and possible solids) that were burned during production of the steam. Those gases are mainly carbon dioxide and nitrogen, when air is used for the combustion process. Additional gases can be present in smaller percentage such as CO, $SO_x$, $NO_x$ and other gases. Due to the presence of combustion gases, the steam produced by direct contact will be used in open circuit systems or in systems that can handle the impurities in the steam.

In recent years, the advantages of direct contact steam generators have become more obvious due to increased awareness of the need to reduce greenhouse gas emissions. Direct contact steam generators are devices preventing such greenhouse gas emissions, for example, by injecting $CO_2$. In the example of the direct contact steam generator for heavy oil recovery applications, portions of injected harmful $CO_2$ gas will permanently stay underground and will not be released into the atmosphere.

The need for the present invention is driven by the challenges facing the heavy oil production industry involved with enhanced oil recovery (EOR), and in particular, steam assisted gravity drainage (SAGD) and cyclic steam stimulation (CSS). The disadvantages of the prior art in direct steam generation prevented SAGD and CSS from becoming preferred commercial solutions for EOR. As a result, indirect steam generator, mainly OTSG and steam drums, are used commercially as the alternative. In the prior art, the systems of both direct and indirect steam generators have a continuous flow of water through the system that maintains a solids concentration at acceptable levels in the steam vessel. Additionally, the flow of water controls solids build-up in the steam reactor for direct generators and in the drum or on the tubes for indirect generators. The dissolved solids concentration increases in the steam reactor as more water transitions from liquid to gas as the process moves along. The water with through the most concentrated solids is rejected from the steam generation process to crystallized treatment facilities or disposal wells. Thus, there is a need to eliminate the need for these additional treatment facilities to convert the waste into solid form.

The prior art of down hole direct contact steam generators do not disclose continuous water flow through the system to remove the solids. However, the generated solids are released to a reservoir. These prior art systems are limited to the use of fuels that are clean fuels as well as the need for clean water, since impurities and generated solids can block the reservoir.

There is also a need to utilize low quality carbon fuel such as coal, coke, and asphaltin as the energy source for the steam production in the heavy oil production industry to replace the widespread use of natural gas. Natural gas is a clean and valuable resource that, from a public perspective, should not be used for steam production in heavy oil extraction. This clean resource should be preserved and used for other valuable processes.

There is a major need to produce steam in a thermally efficient way and to inject the generated $CO_2$ back into the reservoir.

There is a need to use low quality water that contains solids like silica clay from tailings ponds, dissolved solids and organic emulsions, like tar and heavy oil based materials. There is now a need that for low quality water to be used directly with minimal additional treatments prior to steam production.

There is a need to extract the continuously produced waste in a dry solid form that can be efficiently and economically disposed of in a landfill.

Above all, there is a need for an apparatus and process that will enable fulfilling the above mentioned needs in a simple and reliable way.

Various patents have issued that are relevant to the present invention. For example, U.S. Pat. No. 2,916,877, issued on Dec. 15, 1959 to Walter, teaches a pressure fluid generator which utilizes direct contact heat transfer. The pressure fluid generator is in the form of an elongated combustion chamber. A coolant in heat exchange relationship is injected into the combustion chamber to form with the combustion products therein as a gas and superheated vapor working mixture at a relatively high temperature and pressure. Some embodiments include in-line soot filters and circulated water, and the fuel is hydrocarbon gas.

U.S. Pat. No. 4,398,604, issued on Aug. 16, 1983 to Krajicek et al. describes a system for above-ground stationary direct contact horizontal steam generation. The method and apparatus produces a high pressure thermal vapor stream of water vapor and combustion gases for recovering heavy viscous petroleum from a subterranean formation. High pressure combustion gases are directed into a partially water-filled vapor generator vessel for producing a high pressure stream of water vapor and combustion gases. The produced solids are continually removed with reject water.

There are also patents related to applications in heavy oil production. U.S. Pat. No. 4,463,803, issued to Wyatt on Aug. 7, 1984 describes a system for down-hole stationary direct contact steam generation for enhanced heavy oil production. The method and apparatus generates high pressure steam within a well bore. The steam vapor generator is constructed for receiving and mixing high pressure water, fuel and oxidant in a down-hole configuration. The produced solids are discharged to the reservoir.

Various patents have disclosed rotational elements in a steam generator. U.S. Pat. No. 1,855,819, issued on Apr. 26, 1932 to Blomquist et al. describes a rotary boiler, where the pressure chamber is rotating inside the combustion area while producing the steam in an indirect heat exchanger. British patent No. 0 328 339, issued on May 1, 1930 to Kalabin teaches a direct contact steam generator with a rotating pressure vessel. The gases flow to a rotating chamber where they are mixed with air and completely burned. Water covers the walls of the rotating chamber by centrifugal force of the rotating chamber, exposing the water to the gas combustion. Russian Patent No. 2 285 199, issued on Dec. 12, 2004 to Krajazhevskikh, describes a steam generator with a rotating chamber with cap-shaped hollow portions. Combustion gases flow between the rotating chamber and a stationary chamber for indirect heat exchange. Japanese Patent No. 581 153 576, issued on Sep. 9, 1983 to Shirou discloses a steam generator with a horizontal rotating heater filled with ceramic balls. Combustion gas is fed to the rotating heater, where the ceramic balls are heated. Solid materials formed into powders or granules are mixed with the heated balls and transferred through a pipe to a stationary boiler. Steam is generated through indirect heat exchange between the pipe and water.

It is an object of the present invention to provide an apparatus and method for the production of high pressure, dry super-headed steam and a combustion gas mixture using direct contact heat transfer between available water and fuel in a rotating reactor.

It is another object of the present invention to provide an apparatus and method where the waste solids generated by combustion and steam generation are driven by gravity to regenerated surfaces at the bottom of the apparatus. These regenerated surfaces are freely rotating spherical bodies that partly fill a rotating vessel of the apparatus. The spherical bodies remove deposits and build-ups of these waste solids.

It is another object of the present invention to provide an apparatus and method where the waste solids are separated and removed from the main flow of the steam and gas mixture without decreasing the steam-gas mixture pressure and temperature.

It is another object of the present invention to provide an apparatus and method that produces steam from low quality tailing pond and reject water containing high levels of dissolved inorganic solids or organic solids, wherein all water is converted to steam and no liquid is discharged from the apparatus.

It is another object of the present invention to provide an apparatus and method that produces steam from low quality fuel containing inorganic impurities like coal, coke, asphaltin or any other available carbon based fuel, wherein the combustion byproducts of this fuel are slag and ash in solid form.

It is another object of the present invention to provide an apparatus and method that minimizes the amount of energy used to produce the mixture of steam and gas that is injected into an underground formation to recover heavy oil.

It is a further object of the present invention to provide an apparatus and method where the low quality water is converted to steam, without any wastewater flow. The concentration of impurities increases to a maximum through the process of a direct contact steam generator, when the impurities can be removed as solid waste.

It is another object of the present invention to provide a process that produces high temperature steam and gas by rotation. Solids are removed in dry form from the hot gas flow. The hot gas flow and the remaining solids are injected into the vessel, where the solids are scrubbed by the water. A saturated wet steam is produced. The slurry of solids and water continue to pass back and recycle through the rotating steam generator. The saturated wet steam-gas mixture is heated by heat exchange with the hot gases leaving the rotating steam generator to produce super-heated dry steam.

BRIEF SUMMARY OF THE INVENTION

The main advantage of the present invention over the direct contact steam generation of the prior art is the ability to use low quality water and fuel, the ability to avoid liquid discharge waste, and the ability to remove a solid waste byproduct, when all water has been converted to steam and fuel has been converted to gas. In the present invention, solids concentration increases inside the steam generator, where it reaches a maximum concentration as a solid. The extraction of the produced solid waste as part of the steam generation process is advantageous as it eliminates the need for additional treatment facilities to treat the water prior to use in the steam generator, to convert a wastewater flow into solid form and to reduce its volume (like evaporators and crystallizers). The disposal of solid waste in landfills is more economic and environmentally friendly.

Furthermore, the proposed apparatus and method allows direct use of coal for heavy oil recovery, eliminating the burning of natural gas to produce steam and the converting of coal to methane for natural gas in heavy oil recovery. The present invention minimizes the use of the clean and valuable natural gas resource by replacement with coal or other low quality fuels. Additionally, harmful $CO_2$ gas emissions are injected into the underground reservoir and out of the atmosphere.

The present invention is a reaction chamber apparatus for producing a steam and $CO_2$ mixture without generating liquid waste. The apparatus includes a rotatable vessel in a direct contact steam generator. The rotatable vessel has a combustion section and a steam producing section and is partially filled with spherical bodies. The combustion section and the steam producing section are partially separated by a partition or by location in the rotating chamber. A homogenizing section is located at an end of the steam producing section opposite the combustion section. The homogenizing section may have at least one partition wall guiding the flow of gases. The vessel has at least one opening or a fixed collector at the bottom of the vessel to allow for the discharge of solids.

In an alternative embodiment of the present invention, the reaction chamber apparatus includes a fixed combustion vessel and a rotatable steam generating vessel. The combustion vessel and steam generating vessel are in communication with one another. The steam generating vessel is partially filled with spherical bodies. The steam generating vessel has at least one partition wall guiding the flow of gases. Both the steam generating vessel and the combustion vessel have a solids discharge outlet at the bottom of the vessels. The solids discharge outlet is sized such that the spherical bodies will not be discharged from the interior of the vessel.

The present invention is also a process for producing a steam and $CO_2$ mixture, comprising the steps of mixing a low quality fuel with an oxidation gas, combusting the mixture under high pressure and temperature in a vertical rotating drum with spherical bodies to grind the solids resulting from the combustion step, and injecting low quality water containing organic or inorganic materials so as to control combustion temperature and to generate steam in the rotating drum. The waste solids generated by the combustion and steam generation are driven by gravity to regenerated surfaces at the bottom of the rotating drum. The regenerated surfaces are the freely rotating spherical bodies partially filling the rotating vessel. The spherical bodies grind solids deposits and build-ups in the rotating chamber. The fuel is selected from a group consisting of coal, heavy bitumen, vacuum residuals, asphaltin, and coke. The oxidation gas is selected from a group consisting of oxygen, oxygen-enriched air, and air. The spherical bodies improve mixing and heat transfer. Some of the oxidizer is supplied separately with the low quality water, creating a secondary exothermic reaction with partially combusted gases.

The step of combustion includes converting the fuel to a gas and by products in solid or liquid form, such as slag, fly ash and char. The step of steam generation includes converting water from a liquid phase to a gas phase, the gas phase containing steam and $CO_2$. Solids are also separated from the gas phase.

The method of the present invention also includes the steps of cleaning the gas and the steam from fine solid particles in a separator, mixing the gas and steam with water of high temperature and pressure so as to produce a saturated wet steam and gas mixture, scrubbing any remaining solids from the gas, separating the liquid phase from the gas phase, and recycling the water with the scrubbed solids back to the combustion chamber. In the event that the gas contains sulfur, and if there is a need to reduce the amount of sulfur, the process can include adding lime or other chemicals during the step of scrubbing and then reacting the lime or dolomite with the sulfur.

The saturated steam and gas mixture are heated in a heat exchanger with the hot gas phase leaving the combustion chamber to generate super-heated steam and gas, preventing condensation on pipes of the apparatus.

Additives can be injected into the gas phase to protect the pipe from corrosion. The pressure of the clean wet steam is reduced to an injection pressure. The pressure of the dry steam and gas mixture is between 800 and 10,000 kpa The temperature of the dry steam and gas mixture will be between 170° C. and 650° C. The super heated dry steam and gas mixture can be injected into an underground reservoir through a vertical or horizontal injection well, for example in EOR.

DETAILED DESCRIPTION OF THE INVENTION

Figure 1:
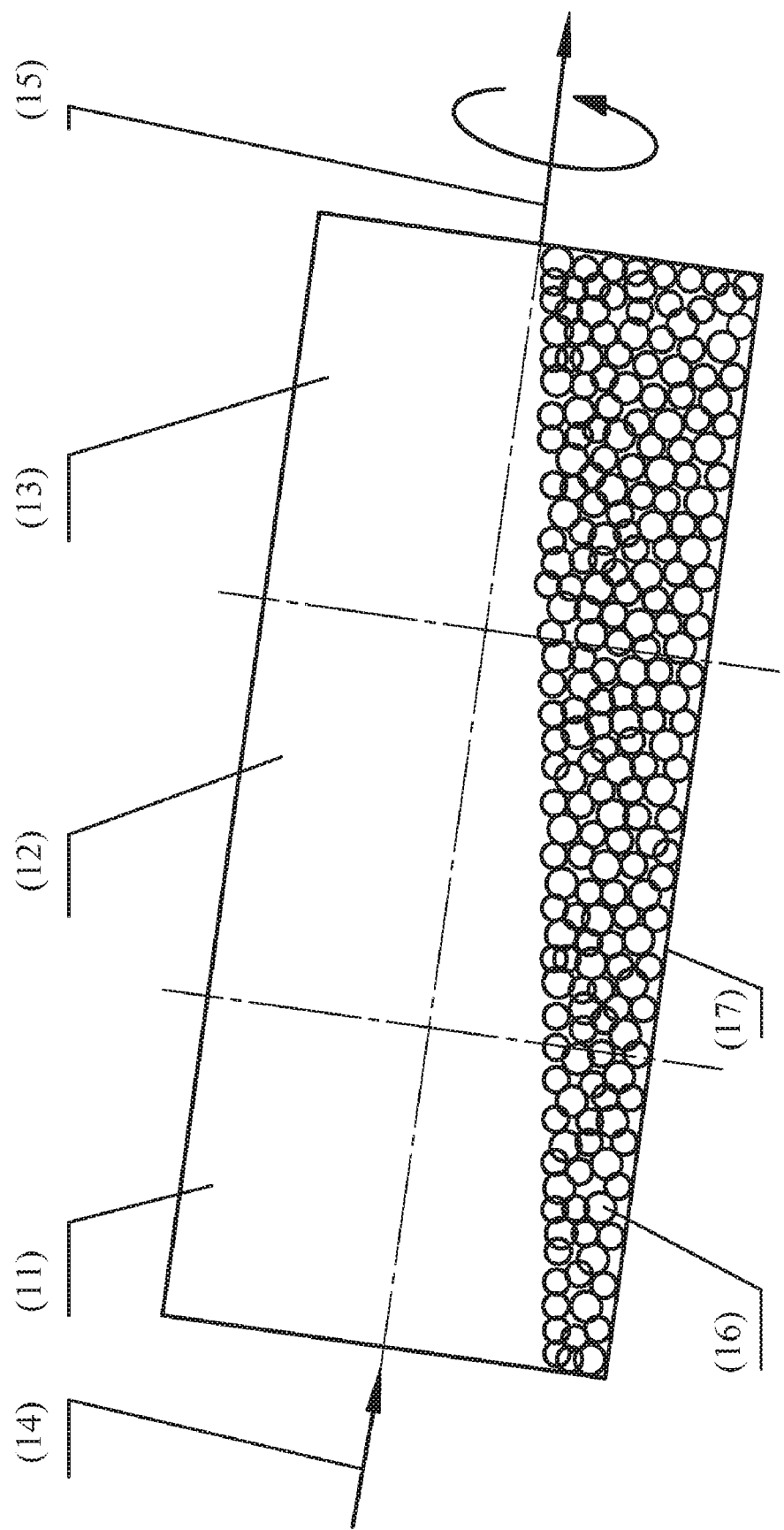
FIG. 1 is a schematic view of a reaction chamber apparatus of a rotating direct contact steam generator of the present invention.

FIG. 1 shows the reaction chamber apparatus of a high-pressure direct contact steam generator of the present invention with a horizontally-sloped pressure vessel 17, partly filled with spherical embodiments 16 that are free to move inside the vessel. The vessel 17 is under pressure and is continually rotating or rotating at intervals. At a high point 14 of the sloped vessel 17, the fuel, oxidizer and water are injected. The fuel can be coal slurry, coke, or hydrocarbons such as untreated heavy low quality crude oil, VR (vacuum residuals), asphaltin, coke, or any available carbon fuel. The oxidizer is a gas (oxygen, enriched air or air) mixed with the fuel in the combustion area 11 of the vessel 17 of the high-pressure direct contact steam generator. The temperature in the combustion area 11 is more than 900° C. to ensure full combustion of the fuel. Water is injected into the exothermal reaction volume in the combustion area 11 to maintain a controlled high temperature, preventing damage to the facility while achieving a full oxidation reaction of the fuel.

Due to the high temperatures in the combustion area 11, melted byproducts are continually created. For example, a fuel like coal would cause slag, ash, and soot byproducts. The slag settles on the bottom of the vessel 17 due to gravity. The bottom of the vessel is partly covered with the free moving spherical embodiments 16. The spherical bodies 16 provide an exposed regenerated surface area for exposing the slag and other combustion solids. The temperature of the spherical bodies 16 is lower than the reaction temperature. The temperature of the spherical bodies 16 is also lower than the slag and ash melting temperature, preferably less than 800° C. at which the slag and ash are solids. The ash and solid deposits left from the reaction (mainly silica, heavy metals etc. that result from the specific type of fuel in use) are settled on the exposed surfaces, mainly the surface area of the spherical bodies 16. Due to rotating movement, the spherical bodies 16 regenerate their surface area by removing and grinding deposits from the vessel 17 walls and each other to form smaller particles of solids to be removed from the reactor vessel 17.

The steam is actually produced in the combustion section 11 and in the steam production section 12, where low quality water is injected to produce steam. The amount of injected water is controlled to produce steam where the dissolved solids remain solids and liquids become gas. Additional chemical materials can be added to the reaction, preferably with any injected water. For example, limestone slurry can be added to the low quality water. The steam production section 12 contains similar spherical bodies 16 that are present in the combustion section 11. When the liquids (primarily water) evaporate, the solids settle on the internal exposed surfaces, mainly on the surface area of the spherical bodies 16. The rotational movement regenerates surface area of the spherical bodies by removing the solid deposits therefrom and from the vessels walls.

The mixture of gas, solids and remaining liquid move to the homogenizer section 13 in the vessel 17, where the heat transfer is completed to provide a homogenous mixture of gas and grinded solids. All the remaining liquid transitions to gas, and the remaining solids are moved to a discharge point 15. The solids at the discharge point are released from the vessel 17 at high temperature and pressure for further processing, such as separation and disposal. It is possible to supply access water in sections 11 and 12 to maintain the solids created both from the combustion and the water evaporation in concentrated and viscous slurry form with saturated steam at the working temperature and pressure.

Figure 2:
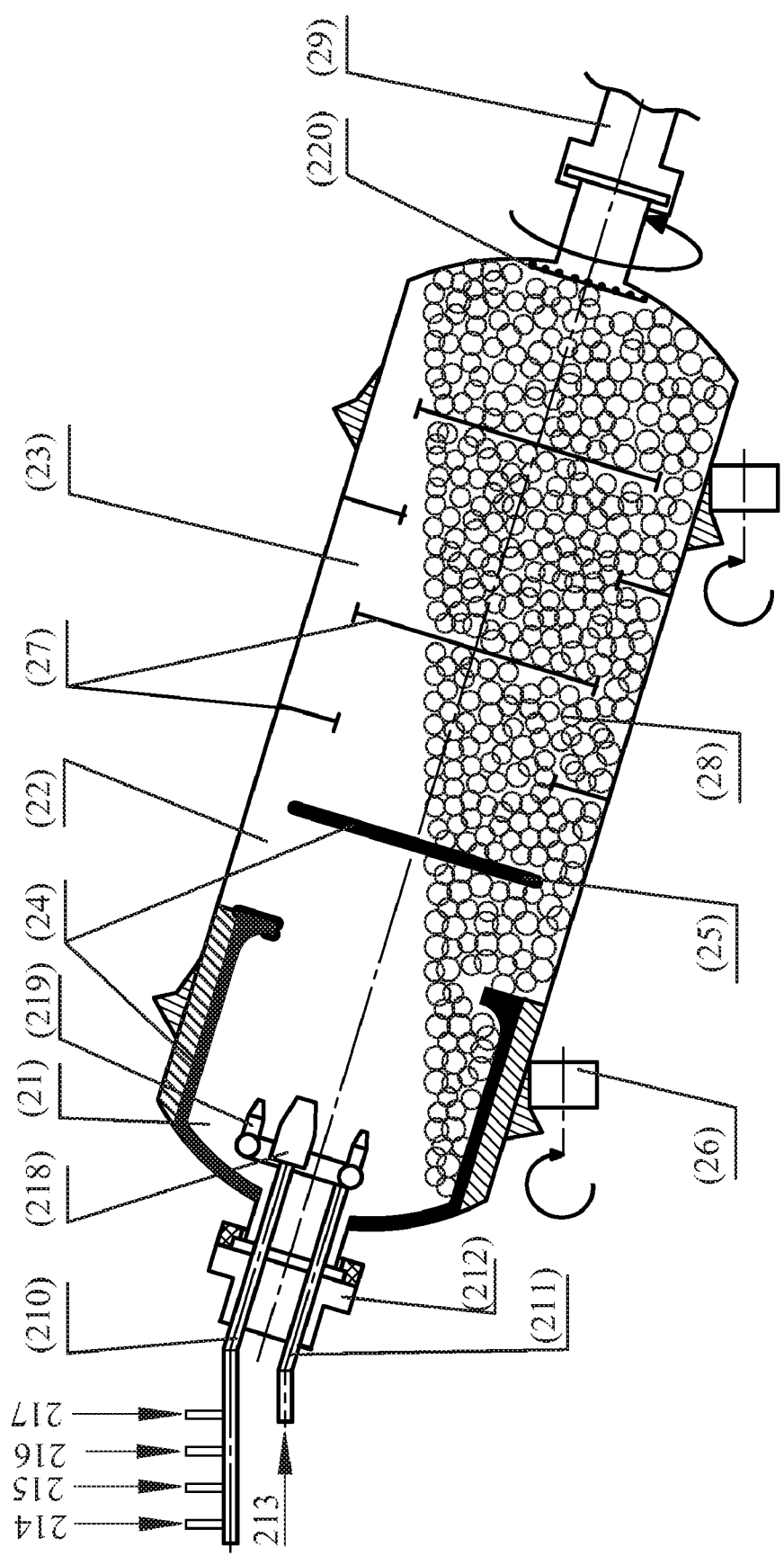
FIG. 2 is a schematic view of the direct contact rotating steam generator of the present invention with partitions.

FIG. 2 shows a reaction chamber apparatus of a rotating steam generator that includes partial partitions. The fuel 214 can be coal slurry, hydrocarbons such as untreated heavy low quality crude oil, VR (vacuum residual), asphaltin, coke or any available carbon fuel. The oxidizer gas 215 can be oxygen, enriched air or air. Steam 216 can be injected through the burner 218 during start-up. The water 217 is injected to the combustion chamber 21 to control high temperatures, preventing structural damage. The water, injected to the burner 218, is relatively high quality water that will not damage the burner 218. The burner 218 is a commercially available burner, such that the required injected water quality can be known. The fuel 214 and oxidizer 215 are injected to the combustion chamber 21 through pipes 210 that are connected to the burner 218. Both pipes 210 for the fuel 214 and oxidizer 215 and pipe 211 for the low quality water are fixed and do not rotate while the vessel rotates.

The connection 212 seals the pipes 210 and 211 connected to the reactor as the pressure inside the combustion chamber increases as required for the production of steam. These rotatable and sealed connections 212 and 29 are commercially available. To avoid leakage, high quality clean water can be used as part of the seal for the high pressure seal medium and cooling fluid when water enters the reactor. This seal has no effect on the steam generator performance.

The temperatures in the combustion section 21 are significantly higher than temperatures experienced during the rest of the steam generation process because the temperatures are driven from typical fuel combustion (and not from the steam generation). The combustion temperature is more than 900° C. and preferably in the range of 1200-1300° C. for low slag fuel. The temperature minimizes the amount of unburned carbons in the slag for any particular fuel in use. The combustion section 21 in the vessel is coated with thermal resistance material 24 that can withstand these high temperature conditions. Low quality water 213 with high solids contamination, like silica clay, totally dissolved solids, and possibly organic materials, such as tar, heavy oil, biologically-contaminated sewage and any similar waste water, is injected through pipe 211 to injectors 219 for injection around the combustion reaction zone.

The bottom of the vessel is partially filled with free rotating spherical bodies 28. The solids are attracted to the spherical bodies 28 due to mass and gravitational force. The water reduces the temperature of the internal spherical bodies 28 to less than the temperature required to solidify the slag, typically less then 850° C. The low quality injected water 213 is evaporated and reduces temperature of the spherical bodies 28 to less then 850° C. The steam is generated in the rotating reactor where the spherical bodies 28 grind the remaining solids and maintain the clean surface of the vessel, where liquids transition into gas and solids are ground into particle waste.

At the back of the primary combustion and steam generation section 22, there is a separation wall 25 that forces the flow of gases and fluids to go around it. At the bottom of the vessel 22, there are the same spherical bodies 28 that grind the solids and work as a heat exchanger.

In section 23 of the vessel, there are partition walls 27 that force the flow of the gases and the fluids to go around and through the spherical bodies 28 to convert all the liquid to gases and grind the solids. The mixture of the gas, mainly steam, $CO_2$, and possibly smaller percentages of other impurities, and the remaining solids are discharged at the other side of the vessel through separation 220, allowing free flow while maintaining spherical bodies 28 in the vessel.

Figure 3:
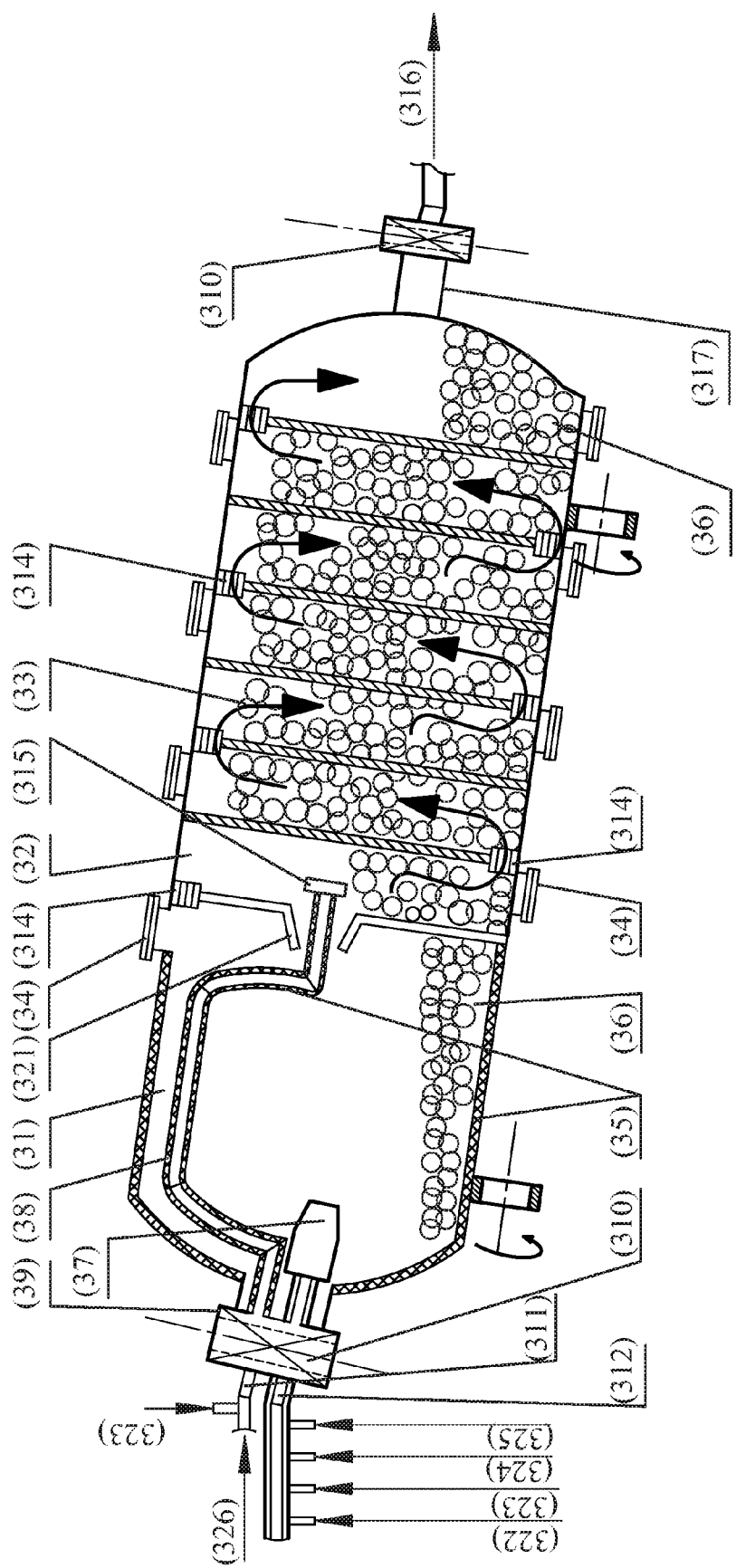
FIG. 3 is a schematic view of another direct contact steam generator with partitions to separate the combustion from the steam generation, increasing the effectiveness of the mixture by forcing the flow through an internal medium.

FIG. 3 shows a reaction chamber of a rotating steam generator having separate chambers with opposite openings for maintenance. The fuel 322, oxidizer 323, steam 324, and high quality water 325 are injected through the rotating seal to the burner 37 located in the combustion chamber 31. The rotating seal is composed of fixed section 310 and rotated section 39 that rotates with the vessel. The combustion occurs outside burner 37 in the combustion chamber 31. The combustion chamber is thermally protected by a protection layer 35. The bottom of the combustion portion is partly filled with spherical bodies 36 that are freely rotating on the vessel bottom. To maintain the temperature under control, high quality water 325 is injected through the burner. To generate the steam, low quality water is injected directly to the steam generated chamber 32. The amount of oxygen 323 injected through burner 37 is less than the amount required for full combustion. The partial combustion is combined with the injected high quality water 325 or the water in the fuel slurry. If the fuel is in the form of a slurry, the temperature in the combustion chamber 31 is maintained at an acceptable level for structural integrity of the vessel.

The combustion section is separated from the steam generator section by a separation partition 321. Low quality water 326 for steam production is injected through this separation partition 321 directly into the steam generation chamber 32 through a fixed, non-rotating pipe 38. Oxidizer 323 is also injected into the steam generator chamber 32 through discharge 315. The oxidizer burns the carbon monoxide and the remaining carbon to produce mainly carbon dioxide and steam. The vessel is divided for internal chambers 33. Each chamber section in the vessel can be accessed through flanged openings 34 from the outside of the vessel. In each separation wall, there is an eccentric opening near the vessel wall 314. These openings are in an opposite direction (180 degrees) from each other, forcing the sludge to flow through the spherical bodies 36 for mixture, heat transfer, scrubbing and removing the generated solids. The openings 314 are arranged in a way that forces gas and liquid to flow through the spherical bodies 36 that partly fill the separate sections of the vessel.

The spherical bodies 36 are different in material and shape within each section. Within the combustion section, the spherical bodies 36 will be medium sized and made from high temperature resistant material. This material can be ceramic or alloyed steel that can also have catalytic characteristics. The spherical bodies 36 at the first steam generation chamber are of a relatively large size to allow the hot gases and liquid to mix. The spherical bodies 36 at the following chambers 33 are smaller in size and can be made from hollow carbon steel.

Each chamber section is accessible from the outside through openings 34. To force the flow through the chambers, there are two eccentric openings 314 from both sides. Those eccentric openings 314 are close to the vessel walls and allow the solids to flow near the bottom of the vessels during rotation. The discharge from the vessel is through pipe 317 centrally located at the back of the vessel. The hot gas and solid mixture flows through the rotation seal connector 310 to pipe 316 for further processing.

Figure 4:
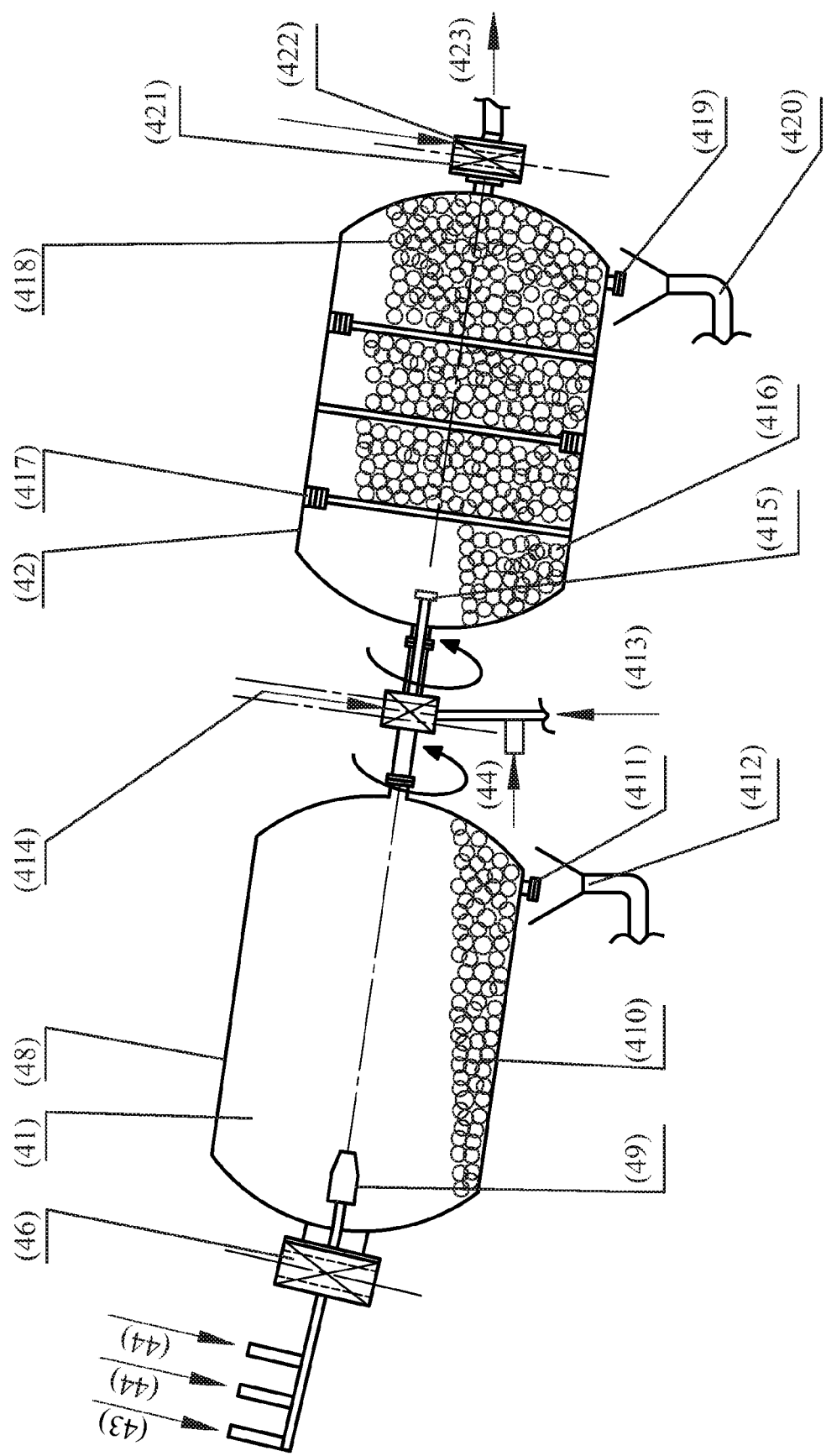
FIG. 4 is a schematic view of an alternate embodiment of a reaction chamber of the direct contact steam generator with two separate rotating vessels, one for the combustion and the second for steam generation.

FIG. 4 shows a reaction chamber with a complete separation of the combustion vessel and the steam production vessel. The advantage of such an arrangement is the separation of solids resulting from the combustion of the solids and solids remaining from the sludge water turning to steam. Fuel 43 and oxidizer 44 injected through the rotating sealed connection 46 to the burner 49. The combustion reactor 41 contains spherical bodies 410 that remove the solid deposits from the vessel walls and grind and mobilize the remaining solids. To reduce the temperature, the oxidizer 44 can be reduced to generate a partial oxidation reaction. High quality water 45 may be injected to the vessel 41 to reduce the temperature. The build-up of grinded solid deposits can be removed through opening 411 in the vessel. The removal can be done during shut-down intervals, when the inside pressure is dropped and where the ground solids from the combustion section are collected in collector 412. The temperature of the produced gas leaving the reactor 41 is in the range of 500-850° C.

The hot gases flow to the steam generator section 42. Low quality water 413 and oxidizer 44 are injected through rotating sealed connection 414 to the steam generation section 42. The steam generation section 42 contains partitions 417 that direct the flow through the spherical bodies 416. The solids from the low quality water 413 are removed in a similar way as from the combustion section 41 through an opening 419 in the last section 418 and a collector 420 where they are collected separately from the combustion solids.

If the fuel contains a significant amount of heavy metals that can be recovered, or if special land-fill disposal is required and if, at the same time, the water contains significant amount of solids, there might be an advantage to using the arrangement described in FIG. 4 for separating the combustion remains.

Figure 5:
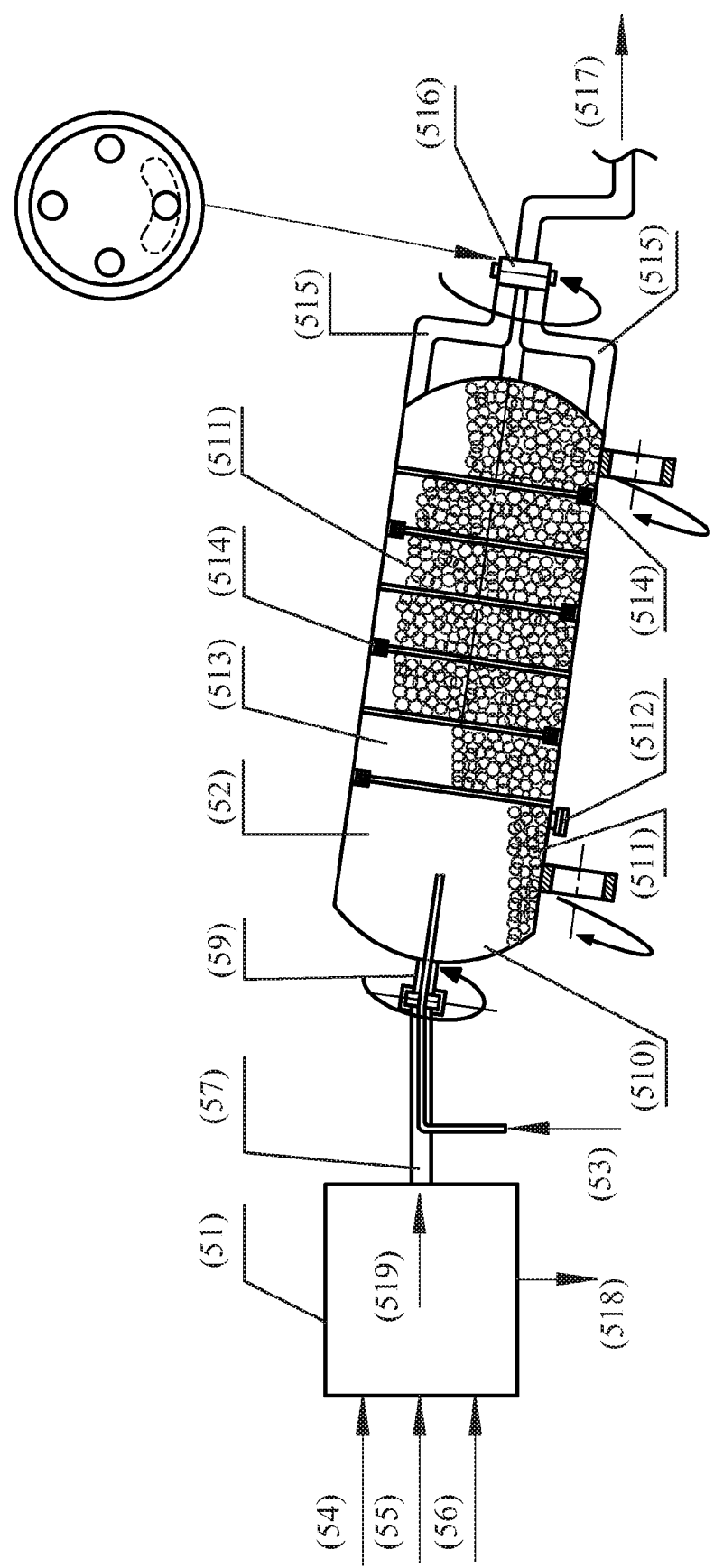
FIG. 5 is a schematic view of another alternate embodiment of a reaction chamber of the direct contact steam generator with a fixed combustion chamber with a rotating steam generator.

FIG. 5 contains a reaction chamber apparatus for a direct contact steam generator with a fixed combustion vessel 51 connected to a rotating steam generator 52. Fuel 54, oxidizer 55 and water 56 are injected to a combustion vessel 51. Solids resulting from the combustion 518 can be removed. The combustion in combustion vessel 51 can be a partial combustion to reduce the temperature of the produced gases 57. The produced hot gas mixture is at temperature of 500-850° C. The mixture flows through the rotation connection 59 to the rotating steam generator 52. Low quality water 53 is injected into the first chamber 510. Oxidizer 55 is also injected to this first chamber 510 where it fully reacts with the partial combusted gases from 519 to produce steam. Section 52 contains spherical bodies 511 that are free to rotate. By rotation, the spherical bodies 511 grind and remove the generated solids, improving heat transfer. The openings between the partitions 514 are located near the vessel wall at opposite sides to force the flow through the spherical bodies 511 that partly fill the volume and to minimize the solids build-up. The discharge from the last vessel section is through pipes 515 that are fixed to the rotating vessel and connected in four locations near the vessel wall.

The rotating connector 516 and fixed pipe 517 are connected to the rotating vessel. The rotating connector 516 connects the lower pipe 515 by exposing the lower pipe 515 to a round disc with slot 519 that is connected to pipe 517. Due to this arrangement, the flow from the rotating vessel is only from its lowest part which efficiently and continually removes the generated solids.

Figure 6:
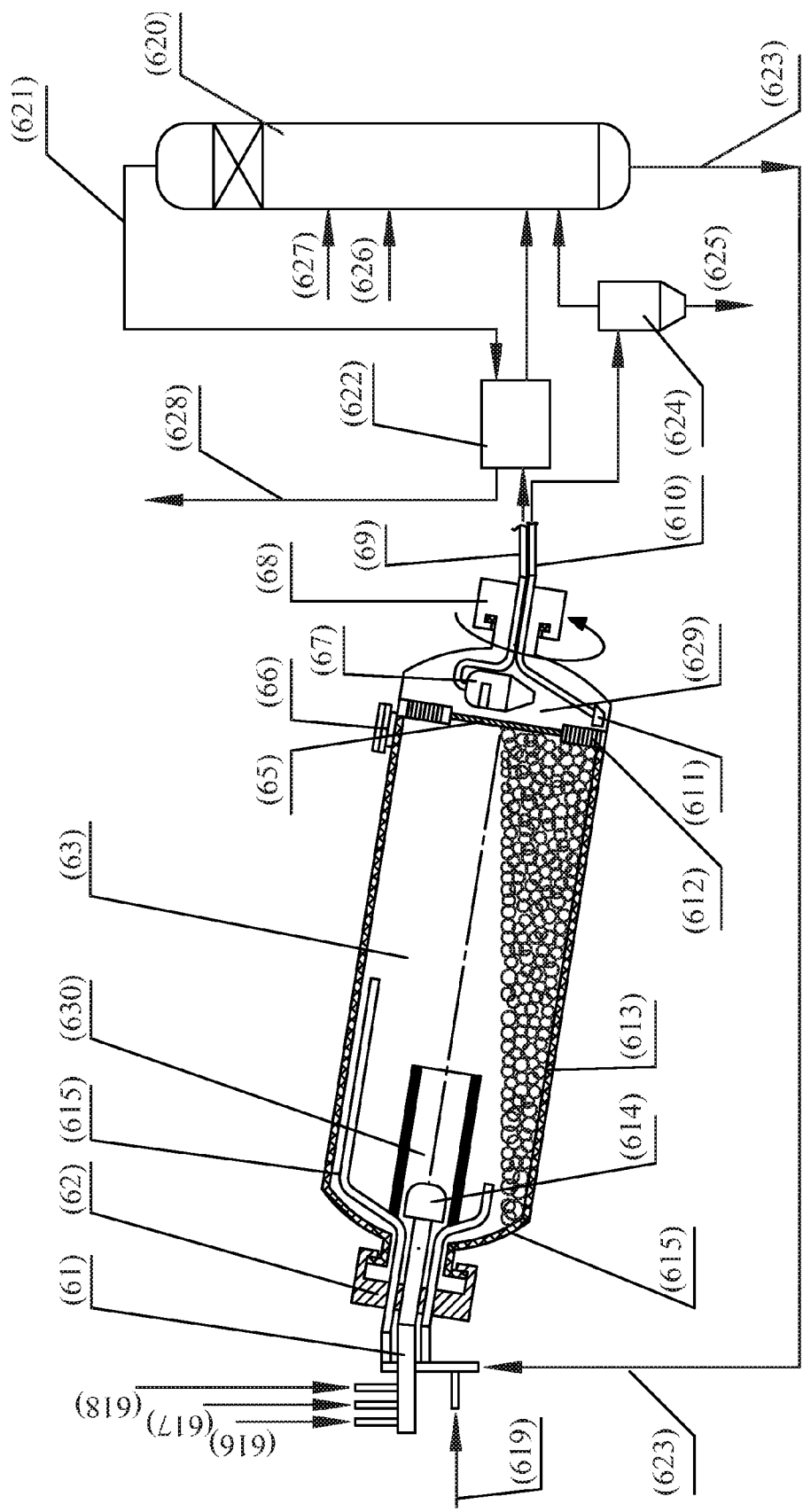
FIG. 6 is another schematic view of the reaction chamber of the direct contact rotating steam generator, wherein the generator is connected to a solids separation and removal section and combined with a wet solid scrubbing section, the saturated mixture being heated to produce a superheated dry mixture.

FIG. 6 shows a reaction chamber apparatus of a direct contact rotating steam generator with solids separation. Fuel 616 (possibly in slurry form), oxidizer 617 (such as oxygen enriched air) and high quality water 618 are injected through rotating connection 62 to high pressure burner 614 located inside a steam generation rotation reactor 63. The pressure in the steam generator reactor is in the range of 800 kpa-10000 kpa, preferably in the range of 3000 kpa-4000 kpa. The temperature in the combustion reaction area is in the range of 900-2500° C., more preferably in the range of 1300-1800° C. The combustion is separated from the rotating steam generator by a sloped sleeve 630. The sleeve 630 is maintained at a high temperature beyond the slag and ash melting temperature where the melted slag and ash flows out from the sleeve. The combustion reaction in the sleeve 630 can be a full reaction where mainly $CO_2$ is produced, or partial combustion where mainly CO is produced. The level of combustion will be set according to the fuel and water in use and the working conditions to prevent over-heating of the combustion area. If partial combustion is used, oxygen or enriched air will be injected with the low quality water 619 through injectors 615.

Low quality water 619 is injected into the vessel through injectors 615 to the boundaries of the combustion reaction zone from sleeve 630, where steam is generated, while the temperature is reduced to solidify the created slag and ash. This low quality water 619 that is injected separately from the burner 614 is not intended to reduce the combustion zone temperature but to protect the structure of the steam generator and to prevent melted slag, ash, and soot particles from sticking to the internal elements with a permanent bond that cannot be ground off by the free rotating spherical bodies 613 moving in the reactor.

The bottom of the vessel is partly filled with spherical bodies 613 that are freely rotating. Separation partition 65 at the back of the vessel keeps the spherical bodies away from the back discharge section 629. The gas and solids flow to the back section 629 through radial openings 612 in separation wall 65 that are close to the vessel wall, preventing the solids from build-up in the steam generation section 63. The first gas-solids separation in the process is inside the rotating section into two gas flows: flow 69 is a lean solids gas and flow 610 is a rich solids gas. Collector 611 is fixed, not rotating with the vessel. The collector 611 is installed close to the bottom of section 629 of the vessel in close proximity (within a few inches) to the rotating vessel bottom where the solids are collected from the rotating vessel bottom, resulting in a rich solids flow 610.

A single or set of fixed solid separation cyclones are installed in the upper section of section 629 where the lean solid flow is directed out from the rotating reactor and the solids directed to the bottom section to the solids collector 611. The temperatures of the discharged rich solids gas stream 610 and the lean solids gas stream 69 are in the range of 170° C. and 650° C., more preferably in the range of 300° C.-450° C. The rich solids stream 610 flows to external secondary solids separation 624 where the solids 625 are separated by a cyclonic separator, centrifugal separator, mesh separator or any other known commercially-available separation system, and disposed in a land-fill or any other method. After separation the lean solid stream 610 is injected into vessel 620.

The lean solid stream 69 flows through superheated steam heat exchanger 622 and is injected into vessel 620. Vessel 620 is maintained at a high pressure 800 kpa-10000 kpa, preferably in the range of 3000 kpa-4000 kpa, slightly less then the pressure at the rotating reactor to allow the flow. It is partially filled with water to wash the remaining solids and possibly to react with gases like sulfur gas, if required. Fresh make-up water 627 is continually injected into the vessel to maintain the scrubbing liquid level. Limestone, dolomite, magnesium oxide or other materials can be injected to the vessel 626 in a slurry form. The solids concentrated reject water is continually removed from the bottom of the vessel 623 where it is injected and distributed, possibly with additional low quality water, back to the rotating steam generation reactor 615. The vessel produces saturated clean wet steam and gas mixture 621. The wet steam flows through heat exchanger 622. It is heated by the lean solid stream 69 flow and becomes superheated dry steam/gas mixture 628. This high pressure product can be injected into an underground formation to enhance oil recovery while minimizing condensation corrosion problems.

Figure 7:
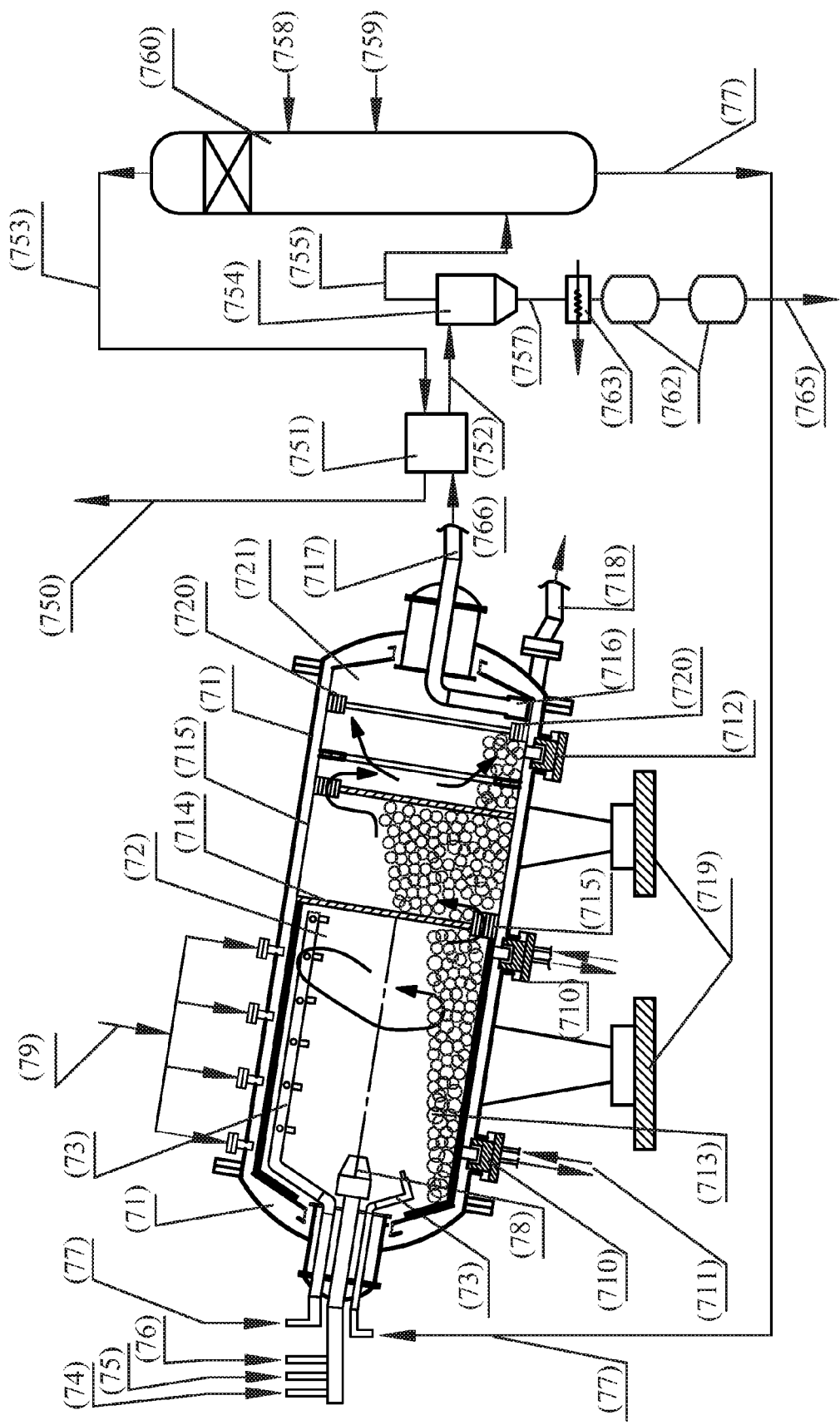
FIG. 7 is a schematic view of still another alternate embodiment of the reaction chamber of the direct contact rotating steam generator with a fixed pressure vessel and a rotating internal enclosure.

FIG. 7 shows a reaction chamber for rotating steam generation with an externally fixed horizontal pressure vessel with external solids separation. An internally mounted rotating enclosure is placed inside the reaction chamber. Fuel 74 (possibly in slurry form), oxidizer 75 (such as oxygen or oxygen-enriched air), and high quality water 76 are injected through fixed pipes welded or bolted to stationary pressure vessel 71. A high pressure burner 78 is located inside the steam generation rotating internal enclosure 72 inside the pressure vessel. The pressure in the vessel is in the range of 800 kpa-10000 kpa, preferably in the range of 300 kpa-4000 kpa. The temperature in the combustion reaction area is in the range of 900-3000° C., more preferably in the range of 1300-1600° C. at the combustion reaction area. Low quality water 77 is continually injected and distributed into the internal rotating enclosure through the distributer flow system 73 where the temperature is reduced on the enclosure walls and the rotating spherical bodies 713 while steam and solids are formed.

The remaining solids are ground by the free rotating spherical bodies inside the rotating enclosure. The rotating enclosure is supported on rotating rollers 710. The rotating rollers 710 can operate hydraulically, electrically or mechanically to maintain the internal pressure while transferring the motion energy. The rollers 710 are operated hydraulically where the hydraulic flow 711 acts also as a heat removal medium from the mechanical components. Rotating cylinder 712 is a typical free rotating roller for supporting the enclosure weight, as not all the supporting rollers need to be powered. The sloped pressure vessel is supported on standard supports 719. The enclosure is divided by partitions 714 with opposite orientation openings 715 that direct the flow through the free rotating spherical bodies.

Discharge chamber 721 do not contains spherical bodies. The produced hot gas, steams and solid mixture flows to the discharge chamber 721 through opening 720 near the enclosure wall to minimize solids build-up. The product is discharged through collector 716 located close to the bottom of the rotating discharge section 72 and discharged to the product pipe 717. The solids can be in a dry grinded form or as a thick slurry form. Cooling water continually injected through pipes 79 is distributed directly on the outside of rotating enclosure 72. The water is continually collected and discharged at the bottom of the pressure vessel 718. That cooling water flow is maintained at a temperature lower than the temperature to maintain steam pressure. As an example, if the reactor pressure is 3000 kpa, the circulated water temperature discharged will be kept under 230° C.

The cooling water 718 flows to a separating vessel where the solids and impurities are separated. The recycled cooling water flows through a heat exchanger where it is cooled while delivering heat and recycles back to pipe 79. The produced steam-gas-solids mixture 717 is discharged from the rotating steam generator at 350° C.-500° C. and flows through heat exchanger 751 where some heat is transferred to a saturated wet flow 753 from vessel 760. The colder line 752 flows to a solid separation section 754 where most of the solids 757 are separated. The solid separation section 754 can be a cyclonic separator, centrifugal separator, mesh separator or any other commercially available solids separator. Heat can be recovered from the rejected solids line 757 through decompression valves and vessel system 762 and discharged as a solid waste 765.

After most of the solids are removed, the lean solids line 755 flows to the wet solid scrubber and steam generation vessel 760. The pressure at the vessel is maintained slightly higher than EOR injection pressure for the steam and gas mixture, and the temperature is the saturated steam temperature. The injected gas 755 generates a constant flex of heat to vessel 760 that creates steam. Make-up water 759 is injected to the vessel to maintain the water level. If required, chemical additives, like limestone slurry 758 can be injected to react with the sulfur. Water with high solids content is discharged from the vessel bottom 77 and recycled back to the rotating steam generator 73, where the solids will be eventually discharged as already described in a dry solid form. The product, which is a high temperature saturated wet steam-gas mixture 753, flows to heat exchanger 751 where it is heated by flow 717 leaving the reactor to the range of 300° C.-400° C. and becomes a superheated dry steam-$CO_2$ mixture that can be delivered through carbon steel pipelines to EOR injection wells where the mixture is injected to the formation without the risk of condensation and corrosion in the flow pipes and the wells.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A reaction chamber apparatus of a direct contact rotating steam generator, comprising:
   a longitudinally rotatable vessel, being horizontally mounted and pressurized and having a combustion section, a steam producing section, and a homogenizing section, said homogenizing section being placed at an end of said steam producing section opposite said combustion section;
   an inlet in said combustion section of said rotatable vessel;
   an outlet at an end of said rotatable vessel;
   a means for injecting water at one of the vessel;
   a means for discharging placed at an end opposite said one end of the vessel; and
   a plurality of spherical bodies located in the rotatable vessel.

2. The apparatus of claim 1, further comprising:
a plurality of partitions being placed between said combustion section and said steam producing section and between said homogenizing section from said steam producing section, said partitions partially separating said combustion section from said steam producing section and said homogenizing section from said steam producing section.

3. The apparatus of claim 1, wherein said spherical bodies in said combustion section are comprised of a temperature resistant material selected from a group consisting of ceramic, steel and alloyed steel.

4. The apparatus of claim 1, wherein each of said spherical bodies have a hollow space therein.

5. The apparatus of claim 1, wherein said spherical bodies have decreasing size from said combustion section to said homogenizing section.

6. The apparatus of claim 1, further comprising:
a fixed horizontal pressure combustor in said combustion section; and
a plurality of pressurized and fixed water injection pipes aligned to said combustion section so that water injects outside and around said combustion section.

7. The apparatus of claim 6, further comprising:
a fixed sloped cylinder separation aligned with the pressure combustor and the water injection pipes, the cylinder being internally maintained at a temperature above a melting point of slag.

8. The apparatus of claim 6, further comprising:
a secondary combustor in said combustion section being placed downstream from said fixed horizontal pressure combustor.

9. The apparatus of claim 1, wherein the rotating vessel is comprised of a fixed volume and an internally mounted rotating enclosure.

10. The apparatus of claim 1, further comprising:
a discharge chamber connected to said homogenizing section of said rotating vessel, said discharge chamber being separated from said spherical bodies.

11. The apparatus of claim 10, further comprising:
a means for separating and removing solids from said rotatable vessel at said means for discharging;
a wet scrubber pressure vessel in fluid connection with said means for separating and removing solids, having saturated steam generated by said wet scrubber pressure vessel, a discharged line recycling scrubbed solids slurry back to the rotatable vessel, and a heat exchanger between said saturated steam and discharge leaving the rotatable vessel.

12. A reaction chamber apparatus of a direct contact rotating steam generator, comprising:
a fixed combustion vessel;
a rotatable steam generating vessel in fluid communication with said combustion vessel, said rotatable steam generating vessel being partially filled with a plurality of spherical bodies and having a steam producing section and a homogenizing section, said homogenizing section being placed at an end of said steam producing section opposite said fixed combustion vessel, the vessel having an injection means for water;
an inlet in said fixed combustion vessel;
a connection element between said fixed combustion vessel and said rotatable steam generating vessel;
an outlet at an end of said rotatable vessel;
a plurality of spherical bodies located in said rotatable steam generating vessel; and
a plurality of partitions being placed between said homogenizing section and said steam producing section.

13. The apparatus of claim 12, said fixed combustion vessel having a solids discharge outlet at a bottom thereof.

14. The process of claim 12, further comprising the step of:
injecting the superheated dry steam and gas mixture into an underground reservoir through an injection well.

15. A method for generating a high pressure steam and $CO_2$ mixture without liquid waste discharge, said method comprising the steps of:
mixing a low quality fuel with an oxidation gas, said fuel selected from a group consisting of coal, heavy bitumen, vacuum residuals, asphaltin and coke, said oxidation gas selected from a group consisting of oxygen, oxygen-enriched air, and air;
combusting the mixture under pressure and elevated temperatures in a rotating drum with a plurality of spherical bodies, said spherical bodies having a regenerated surface by grinding solids from combustion and facilitating mixing and heat transfer; and
mixing water containing solids to control temperature and to generate steam in a rotating drum.

16. The method of claim 15, said step of combusting comprising:
transferring a liquid phase to a gas phase, said gas phase containing steam and carbon dioxide; and
separating solids from said gas phase.

17. The method of claim 16, said step of combusting further comprising:
cleaning said gas and said steam from solids particles in a separator;
mixing said gas and said steam in a flow with heated and pressurized water to produce a saturated wet steam and gas mixture;
scrubbing any remaining solids from said gas;
separating the liquid phase from said gas phase; and
recycling said water with scrubbed solids back to a combustion chamber.

18. The method of claim 17, further comprising the steps of:
removing corrosive contaminating gas from said gas phase; and
injecting additives to said gas phase, protecting said pipe from corrosion.

19. The method of claim 17, further comprising the step of:
reducing pressure of clean wet steam and a carbon dioxide mixture to an injection pressure so as to produce dry stream in order to prevent condensation.

20. The method of claim 19, further comprising the step of:
adding heat to the steam and carbon dioxide through a heat exchanger so as to produce a superheated dry steam and gas mixture.

* * * * *